US012798427B2

(12) United States Patent
Kaneda et al.

(10) Patent No.: US 12,798,427 B2
(45) Date of Patent: Nov. 17, 2026

(54) RELAY CONTROL DEVICE AND RELAY CONTROL METHOD

(71) Applicant: HITACHI ASTEMO, LTD., Hitachinaka (JP)

(72) Inventors: Toshihiko Kaneda, Hitachinaka (JP); Keisuke Suzuki, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 847 days.

(21) Appl. No.: 18/249,289

(22) PCT Filed: Sep. 22, 2021

(86) PCT No.: PCT/JP2021/034888
§ 371 (c)(1),
(2) Date: Apr. 17, 2023

(87) PCT Pub. No.: WO2022/085361
PCT Pub. Date: Apr. 28, 2022

(65) Prior Publication Data
US 2023/0398897 A1 Dec. 14, 2023

(30) Foreign Application Priority Data
Oct. 23, 2020 (JP) ................................ 2020-177758

(51) Int. Cl.
*H02J 7/00* (2026.01)
*B60L 53/62* (2019.01)
*B60L 53/66* (2019.01)

(52) U.S. Cl.
CPC .............. *B60L 53/66* (2019.02); *B60L 53/62* (2019.02)

(58) Field of Classification Search
None
See application file for complete search history.

(56) References Cited

U.S. PATENT DOCUMENTS

2010/0045450 A1 2/2010 Suzuki et al.
2014/0247121 A1 9/2014 Satake et al.
(Continued)

FOREIGN PATENT DOCUMENTS

DE 10 2014 202 521 A1 9/2014
DE 11 2016 004 814 T5 7/2018
(Continued)

OTHER PUBLICATIONS

German Office Action issued in corresponding DE Application No. 11 2021 004 384.6, dated Nov. 27, 2025 with English translation (11 pages).
(Continued)

*Primary Examiner* — Arun C Williams
(74) *Attorney, Agent, or Firm* — Foley & Lardner LLP

(57) ABSTRACT

A relay control device controls a relay circuit mounted on a vehicle and connecting an inverter circuit that drives a motor mounted on the vehicle and a battery, the relay control device including: an end detection unit that detects that traveling of the vehicle has ended; and a determination unit that determines a possibility that power is supplied to the battery from an outside, and controls a time taken from when traveling of the vehicle ends to when the relay circuit is turned off based on the determination.

9 Claims, 15 Drawing Sheets

(56) References Cited

U.S. PATENT DOCUMENTS

| | | | | |
|---|---|---|---|---|
| 2015/0137755 | A1 | 5/2015 | Sadano et al. | |
| 2017/0305287 | A1* | 10/2017 | Affret ..................... | B60L 53/14 |
| 2018/0134163 | A1 | 5/2018 | Kuribara et al. | |
| 2018/0264958 | A1* | 9/2018 | Okada ..................... | H02P 27/06 |
| 2018/0300965 | A1 | 10/2018 | Mori et al. | |
| 2018/0345816 | A1 | 12/2018 | Sakakibara | |

FOREIGN PATENT DOCUMENTS

| | | | |
|---|---|---|---|
| JP | 2008-279938 | A | 11/2008 |
| JP | 2014-131434 | A | 7/2014 |
| JP | 2015-100185 | A | 5/2015 |
| JP | 2018-082576 | A | 5/2018 |
| JP | 2018-207683 | A | 12/2018 |

OTHER PUBLICATIONS

International Search Report with English Translation and Written Opinion dated Nov. 22, 2021 in corresponding International Patent Application No. PCT/JP2021/034888 (9 pages).

* cited by examiner

RELAY CONTROL DEVICE AND RELAY CONTROL METHOD

TECHNICAL FIELD

The present invention relates to a relay control device and a relay control method.

BACKGROUND ART

Electric vehicles powered by electric energy instead of fossil fuels are increasing. Such an electric vehicle stores the electrical energy in a battery. When operation of the electric vehicle is stopped, it is desirable to cut off the battery from other components of the electric vehicle in order to prevent battery consumption and ensure safety. Therefore, the electric vehicle includes a relay that switches connection of the battery. PTL 1 discloses an electrically driven vehicle including a storage battery and an inlet connected to the storage battery, in which a connector of an external power supply source is connected to the inlet, and power is able to be supplied from the external power supply source to the storage battery, the electrically driven vehicle including: alighting preparing operation detection means for detecting an alighting preparing operation of a user; temperature acquisition means for acquiring an environmental temperature at the time of detection of the alighting preparing operation, a predicted environmental temperature which is an environmental temperature predicted to be realized after a predetermined time from the time of detection, or a storage battery temperature which is a temperature of the storage battery at the time of detection, in accordance with detection of the alighting preparing operation; and notification means for prompting the user to connect the connector to the inlet when the environmental temperature, the predicted environmental temperature, or the storage battery temperature, which has been acquired, is equal to or lower than a predetermined temperature.

CITATION LIST

Patent Literature

PTL 1: JP 2018-207683 A

SUMMARY OF INVENTION

Technical Problem

In the invention described in PTL 1, there is room for study on the life of the relay.

Solution to Problem

A relay control device according to a first aspect of the present invention is a relay control device that controls a relay circuit mounted on a vehicle and connecting an inverter circuit that drives a motor mounted on the vehicle and a battery, the relay control device including: an end detection unit that detects that traveling of the vehicle has ended; and a determination unit that determines a possibility that power is supplied to the battery from an outside, and controls a time taken from when traveling of the vehicle ends to when the relay circuit is turned off based on the determination.

A relay control method according to a second aspect of the present invention is a relay control method in which a computer controls a relay circuit mounted on a vehicle and connecting an inverter circuit that drives a motor mounted on the vehicle and a battery, the relay control method including: detecting that traveling of the vehicle has ended; and determining a possibility that power is supplied to the battery from an outside, and controlling a time taken from when traveling of the vehicle ends to when the relay circuit is turned off based on the determination.

Advantageous Effects of Invention

According to the present invention, the life of the relay can be extended by reducing the frequency of opening and closing the relay.

DESCRIPTION OF EMBODIMENTS

First Embodiment

Hereinafter, a first embodiment of a vehicle controller which is a relay control device according to the present invention will be described with reference to FIGS. 1 to 4.

(Vehicle and Charging Spot)

Figure 1:
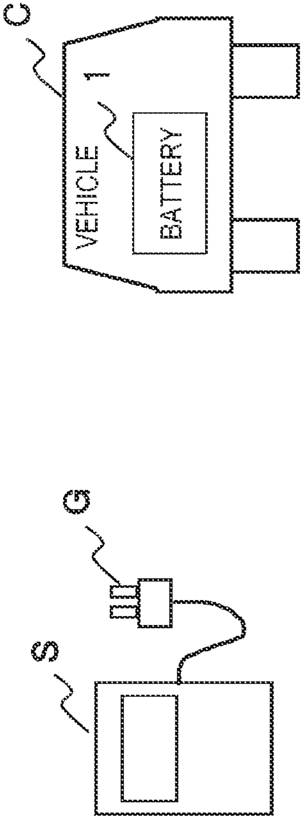
FIG. 1 is a diagram illustrating a relationship between a vehicle C and a charging spot S.

FIG. 1 is a diagram illustrating a relationship between a vehicle C and a charging spot S. The vehicle C according to the present embodiment includes a battery 1 incorporated therein and charges the battery 1 by receiving electric energy supplied from the outside. In the present embodiment, a facility that shares electric energy with the vehicle C is referred to as the charging spot S. The charging spot S may be a commercial facility or a household facility. In addition, the charging spot S does not need to exist independently and may be integrally inseparable from other configurations. The charging spot S includes a charging gun G connected by a cable. The charging gun G is a plug for charging and is inserted into the vehicle C to perform charging. The length of the cable of the charging gun G is known. Hereinafter, an occupant of the vehicle C is referred to as a “user”.

(Configuration of Vehicle)

Figure 2:
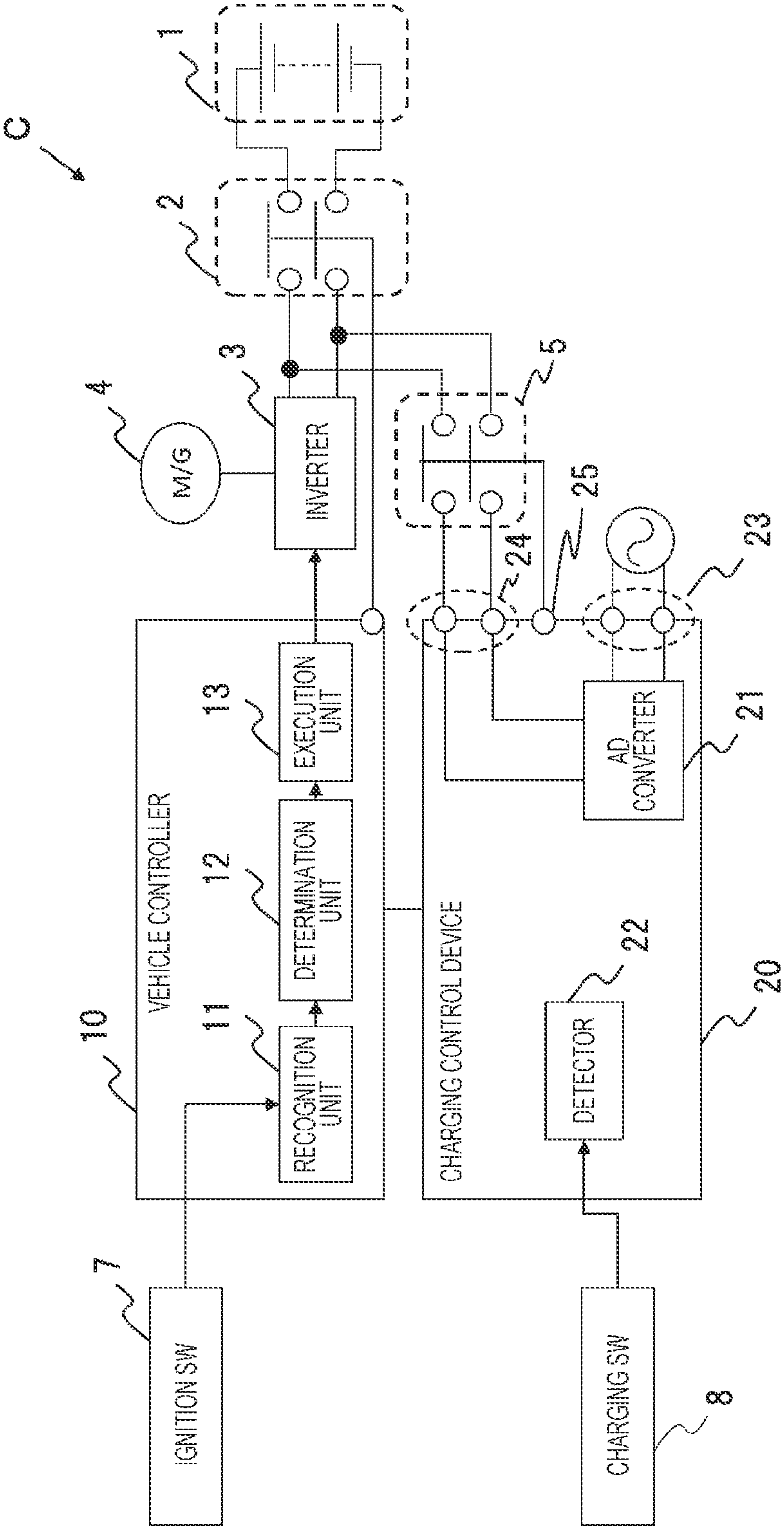
FIG. 2 is a diagram illustrating a configuration of the vehicle according to a first embodiment.

FIG. 2 is a diagram illustrating a configuration of the vehicle C. The vehicle C includes a vehicle controller 10, a charging control device 20, the battery 1, a main relay circuit 2, an inverter 3, a motor 4, a charging relay circuit 5, an ignition switch 7, and a charging switch 8. Hereinafter, the ignition switch 7 may be referred to as an “ignition SW”, an “IGN switch”, and an “IGN SW”.

The vehicle controller 10 includes a recognition unit 11, a determination unit 12, and an execution unit 13. The charging control device 20 includes an AD converter 21, a detector 22, an AC input terminal 23, a DC output terminal 24, and a charging relay circuit control terminal 25. Since the vehicle controller controls the main relay circuit 2 as described later, the vehicle controller 10 can also be referred to as a “relay control device”.

The vehicle controller 10 and the charging control device may be, for example, an electronic control unit (ECU) and includes computable hardware. The computable hardware is, for example, at least one of a combination of a central processing unit (CPU), a read only memory (ROM) which is a read-only storage device, and a random access memory (RAM) which is a readable/writable storage device, a field programmable gate array (FPGA) which is a rewritable logic circuit, or an application specific integrated circuit (ASIC).

The main relay circuit 2 performs switching between a connection state and a non-connection state of the battery 1 and the inverter 3. The charging relay circuit 5 performs switching between a connection state and a non-connection state of the charging control device 20 and the main relay circuit 2. The inverter 3 operates the motor 4 by using electric energy stored in the battery 1 based on an operation command of the execution unit 13. The motor 4 operates the vehicle C by using the electric energy obtained through the inverter 3. Note that, hereinafter, transitioning a certain relay circuit to the connected state is also referred to as “ON”, and transitioning to the non-connected state is also referred to as “OFF”.

The ignition switch 7 and the charging switch 8 are operated by the user. The ignition switch 7 can switch between two states, an ON state and an OFF state. The user indicates that traveling of the vehicle C has ended by turning off the ignition switch 7. In other words, detecting that the ignition switch 7 is in the OFF state is equivalent to detecting that the traveling of the vehicle has ended. The charging switch 8 can switch between two states, an ON state and an OFF state. An initial state of the charging switch 8 is the OFF state, and the user expresses his/her intention to charge the battery 1 from now by turning on the charging switch 8. When the user sets the charging switch 8 to ON, the ON state is maintained until the user changes the charging switch 8 to OFF or the ignition switch 7 is turned ON next time.

The recognition unit 11 recognizes the operation of the ignition switch 7 by the user. In addition, the recognition unit 11 receives a signal indicating that the charging gun G has been inserted from the detector 22 of the charging control device 20. The charging control device 20 includes an AD converter 21, a detector 22, an AC input terminal 23, a DC output terminal 24, and a charging relay circuit control terminal 25. The AC input terminal 23 is a supply port that supplies AC power to the vehicle C. For example, the charging gun G provided in a charging stand is inserted into the AC input terminal 23. The AC input terminal 23 includes, for example, a contact switch or a proximity switch (not illustrated), and detects insertion of the charging gun G into the AC input terminal 23 by the user.

The determination unit 12 performs determination to be described later and outputs an operation command to the execution unit 13. As will be described later, the determination unit 12 sets a charging standby mode and varies control of the main relay circuit 2 when the ignition switch 7 is turned off. Once the ignition switch 7 is turned off by the user, the vehicle C is not driven. Therefore, in order to prevent discharge of the battery 1 and ensure safety, it is desirable to immediately cause the main relay circuit 2 to transition to the non-connected state. On the other hand, if the battery 1 is charged, the main relay circuit 2 is desirably kept in the connection state in order to reduce the number of times a contact is opened and closed. Therefore, in the present embodiment, the probability of charging the battery 1 is estimated and reflected in a value of the charging standby mode. In the present embodiment, an initial value of the charging standby mode is OFF, and the determination unit changes the charging standby mode to ON if the probability of charging the battery 1 is higher than a predetermined threshold.

The execution unit 13 operates in accordance with the operation command of the determination unit 12. Specifically, the execution unit 13 outputs an operation command to the inverter 3 and the main relay circuit 2. In addition, the execution unit 13 executes predetermined processing, a power-off routine, and a charging routine.

Figure 3:
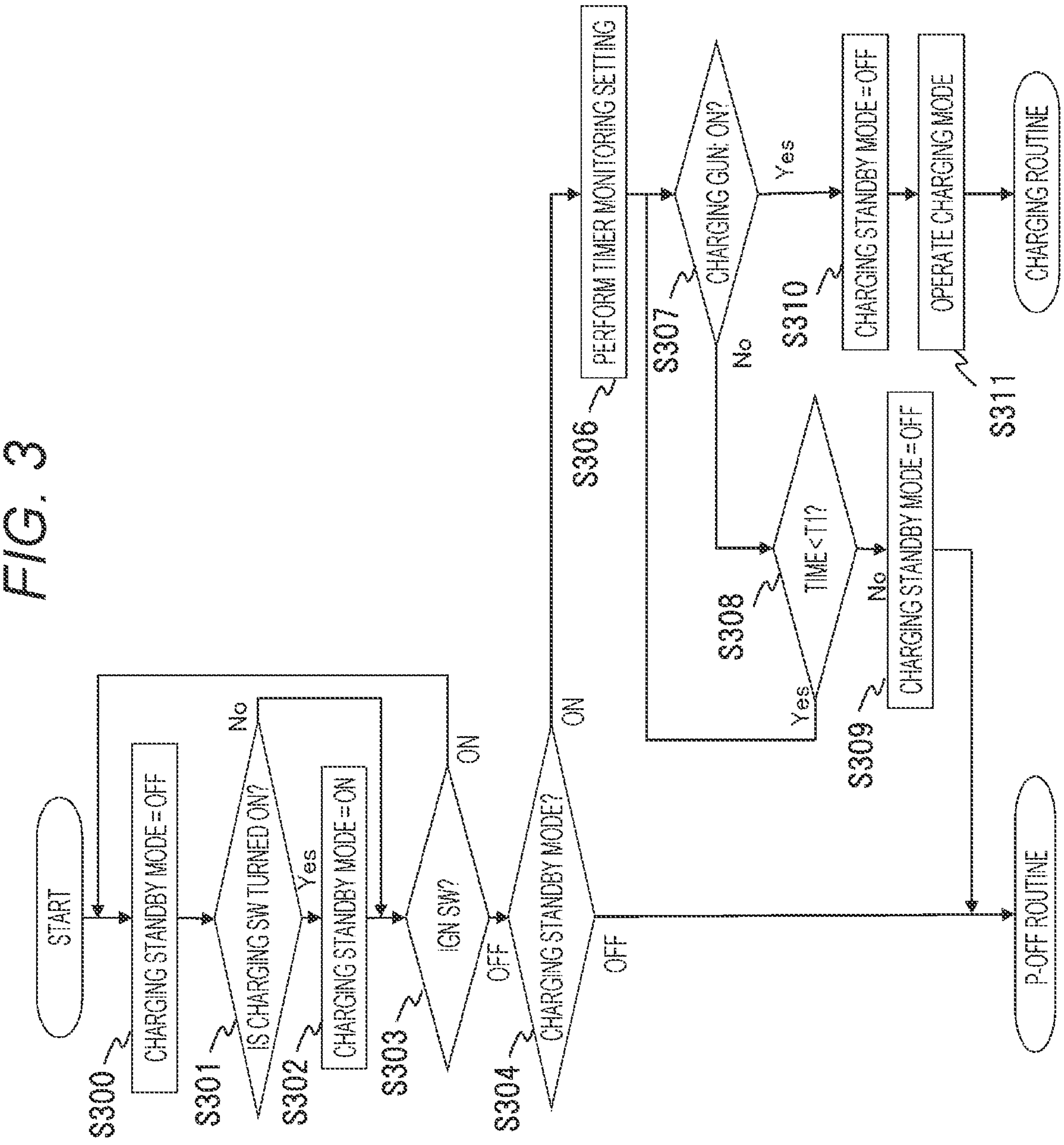
FIG. 3 is a flowchart illustrating an operation of a determination unit according to the first embodiment.

FIG. 3 is a flowchart illustrating an operation of the determination unit 12 according to the first embodiment. First, in step S300, the determination unit 12 sets the charging standby mode to OFF. In subsequent step S301, the determination unit 12 determines a state of the charging switch 8, proceeds to step S302 in a case where it is determined that the charging switch 8 is in the ON state, and proceeds to step S303 in a case where it is determined that the charging switch 8 is in the OFF state. As described above, when the user sets the charging switch 8 to ON, the ON state is maintained until the user changes the charging switch 8 to OFF or the ignition switch 7 is turned on next time. Therefore, in a case where an affirmative determination is made in step S301, an affirmative determination is made in step S301 in the next and subsequent times as long as the user does not change the charging switch 8 to OFF.

In step S302, the determination unit 12 changes the charging standby mode from OFF to ON, and proceeds to step S303. In step S303, the determination unit 12 determines the state of the ignition switch 7, proceeds to step S304 in a case where it is determined that the ignition switch 7 is in the OFF state, and returns to step S300 in a case where it is determined that the ignition switch 7 is in the ON state.

In step S304, the determination unit 12 determines a set value of the charging standby mode, proceeds to the power-off routine in a case where it is determined that the charging standby mode is set to OFF, and proceeds to step S306 in a case where it is determined that the charging standby mode is set to ON.

In step S306, the determination unit 12 performs timer monitoring setting and proceeds to step S307. In other words, the determination unit 12 sets a timing at which the processing of step S306 is started as time t=0 and starts counting up of time. In step S307, the determination unit 12 determines whether or not the charging gun G has been inserted by using an output of the recognition unit 11. In a case where it is determined that the charging gun G has been inserted, the processing proceeds to step S310. In a case where it is determined that the charging gun G has not been inserted, the processing proceeds to step S308. In step S308, the determination unit 12 determines whether or not an elapsed time from timer monitoring is less than a predetermined threshold T1. The determination unit 12 returns to step S307 in a case where it is determined that the elapsed time is less than T1, and proceeds to step S309 in a case where it is determined that the elapsed time is equal to or more than T1.

In step S309, since the user has not inserted the charging gun G within a predetermined time contrary to the setting of the charging switch 8, the determination unit 12 sets the charging standby mode to OFF and proceeds to the power-off routine. In step S310, the determination unit 12 sets the charging standby mode to OFF. In subsequent step S311, the determination unit 12 instructs the charging control device 20 to start charging and starts the charging routine.

Note that the charging routine and the power-off routine are known operations, and thus details thereof are omitted, but the outline thereof is as follows. In the charging routine, after the AD converter 21 starts to operate and communication between the charging control device 20 and the vehicle controller 10 is established, the charging relay circuit 5 is caused to transition to the connected state to start charging the battery 1. In the power-off routine, after discharging is requested, the amount of high-voltage current is checked, a contact on a positive electrode side of the main relay circuit 2 is turned off, and then a contact on a negative electrode side is turned off, so that the main relay circuit 2 transitions to the non-connection state.

(Time Chart)

Figure 4:
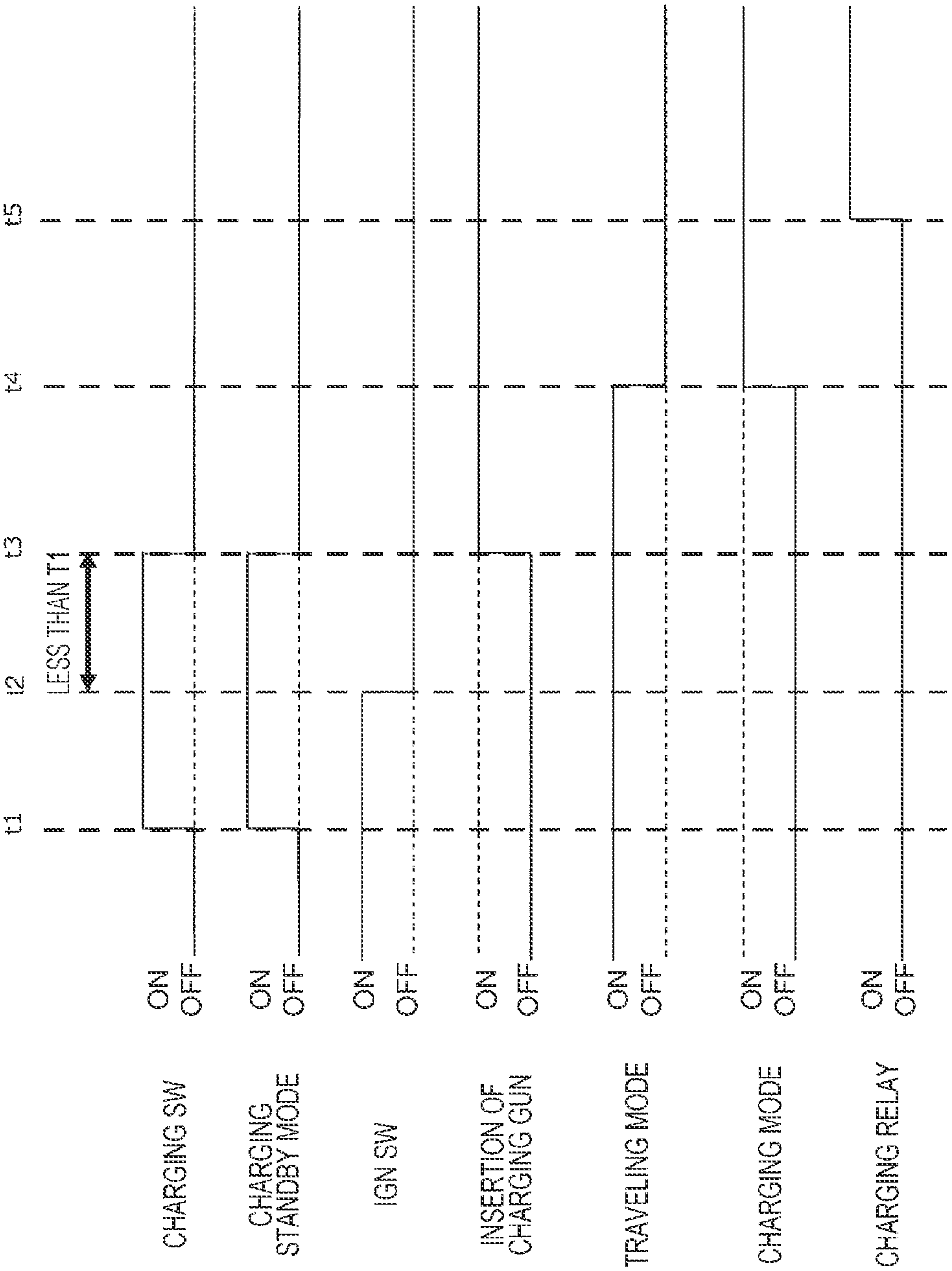
FIG. 4 is a time chart according to the first embodiment.

FIG. 4 is a time chart according to the first embodiment. In FIG. 4, time passes from left to right in the drawing. Various pieces of information are illustrated in the vertical direction of FIG. 4. Specifically, a distance between the vehicle C and the charging spot, the state of the charging switch 8, the charging standby mode, the state of the ignition switch 7, the insertion of the charging gun G, a traveling mode, a charging mode, and connection of the charging relay circuit 5 are illustrated from the top. Note that the inter-spot distance is not particularly mentioned in the first embodiment, but is described for comparison with the following embodiment.

In FIG. 4, time t1 to time t5 are set, and time t1, time t2, and time t3 are times when the operation by the user is performed. At time t1, the charging switch 8 is changed to the ON state by the user. At time t2, the ignition switch 7 is changed to the OFF state by the user. At time t3, the charging gun G is inserted by the user. Note that a time between the time t2 and the time t3 is less than the threshold T1.

Since the charging switch 8 is changed to the ON state by the user at time t1, the processing proceeds from step S301 to step S302 in FIG. 3, and the charging standby mode is changed to the ON state at time t1. Since the user inserts the charging gun G at time t3, the processing proceeds from step S307 to step S310, and the charging standby mode is set to OFF. Since charging starts, the determination unit 12 sets the charging mode to ON at time t4 and turns off the traveling mode. Then, in step S311 subsequent to step S310, since the vehicle controller 10 instructs the charging control device 20 to start charging, the charging relay circuit 5 is set to ON at time t5.

According to the above-described first embodiment, the following actions and effects can be obtained.

(1) The vehicle controller 10, which also serves as the relay control device, controls the main relay circuit 2 mounted on the vehicle C and connecting the inverter 3 that drives the motor mounted on the vehicle C and the battery 1. The vehicle controller 10 includes the recognition unit 11 that detects that traveling of the vehicle C has ended via the ignition switch 7, and the determination unit 12 that determines a possibility that power is supplied to the battery 1 from the outside and controls a time taken from when traveling of the vehicle C ends to when the main relay circuit 2 is turned off based on the determination. Therefore, the life of the relay can be extended by reducing the frequency of opening and closing the main relay circuit 2.

More specifically, in a case where the main relay circuit 2 is immediately turned off when the ignition switch 7 is turned off, the main relay circuit 2 is turned on again when the battery 1 is charged, and the main relay circuit 2 is turned off after the charging is completed. On the other hand, in the present embodiment, if the ignition switch 7 is turned off after the charging switch 8 is turned on, the ON state of the main relay circuit 2 is maintained during time T1. Therefore, by inserting the charging gun G within time T1, charging can start without closing and opening the main relay circuit 2, and the number of contacts can be reduced.

(2) The vehicle controller 10 includes the recognition unit 11 that recognizes through hardware an intention of the user who is the occupant of the vehicle C to charge the battery. Once the recognition unit 11 recognizes the intention of the user to charge the battery, that is, recognizes that the charging switch 8 is in the ON state, the determination unit 12 maintains the ON state of the main relay circuit 2 for at least time T1 after the recognition unit 11 detects that the ignition switch 7 is off (S304 in FIG. 3: ON and S308). Therefore, when the user presses the charging switch 8, the connection state of the main relay circuit 2 can be maintained only for time T1 even in a case where the ignition switch 7 is set to OFF.

(3) The recognition unit 11 recognizes the intention of the user to charge the battery by detecting that the user has pressed the charging switch 8.

First Modified Example

In the first embodiment described above, the charging spot S includes the charging gun G connected by the cable, and power is supplied to the vehicle C by wire. However, the charging spot S may include a wireless power supply facility to wirelessly supply power to the vehicle C. In this case, the vehicle C includes a wireless power receiving device, and wireless communication (hereinafter, referred to as "power supply start communication") for starting power supply is performed between the vehicle C and the charging spot S before wireless power supply is performed. Therefore, in the present modified example, it is sufficient if the recognition unit 11 recognizes the power supply start communication and notifies the determination unit 12 of the power supply start communication, and the determination unit 12 detects the power supply start communication instead of inserting the charging gun G.

According to the first modified example, not only in a case of using wired power supply but also in a case of using wireless power supply, the same actions and effects as those of the first embodiment can be obtained.

Second Modified Example

Instead of the charging switch 8, a speech recognition system or a touch panel may be used. For example, a microphone and a speech recognition system may be mounted on the vehicle C, and the speech recognition system may recognize a specific utterance of the user, for example, a speech "charging reservation", and output the recognition result to the recognition unit 11. Once a notification indicating that the specific utterance is recognized from the speech recognition system is received, the determination unit 12 performs processing similar to the processing performed when the charging switch 8 is pressed. In addition, a touch panel may be mounted on the vehicle C, and when the user touches the touch panel, the touch may be output to the recognition unit 11, and the determination unit 12 may treat the output of the touch as pressing of the charging switch 8.

Third Modified Example

The vehicle controller 10 may have a function of timer charging for the battery 1. The timer charging is set by the user using a user interface (not illustrated), and there are options such as "no setting", "after one hour", and "after three hours". In a case where "no setting" is set, charging of the battery 1 starts immediately after the charging gun G is inserted. In a case where "after one hour" is set, charging of the battery 1 starts one hour after the charging gun G is inserted, and in a case where "after three hours" is set, charging of the battery 1 starts three hours after the charging gun G is inserted.

In the present modified example, in step S304 of the flowchart illustrated in FIG. 3, in a case where the charging standby mode is turned off and in a case where the timer charging is set to other than "no setting", the processing proceeds to the power-off routine. This is because, in a case where the timer charging is set to other than "no setting", it is clear that charging does not immediately starts, and thus the main relay circuit 2 should transition to the non-contact state in order to ensure safety. When a set time elapses after the processing of the power-off routine is completed, charging of the battery 1 starts. In addition, in step S304, in a case where the charging standby mode is turned on and the timer charging is set to "no setting", the processing proceeds to step S306.

According to the third modified example, the timer charging can be supported.

Fourth Modified Example

In the first embodiment described above, it has been described that the ignition switch 7 is operated by the user. However, the ignition switch 7 may be operated by other than the user, for example, a vehicle control system (not illustrated) that controls the vehicle C. For example, the ignition switch 7 may be set to OFF when the vehicle control system determines that the vehicle has arrived at a destination.

In a case where there is a vehicle control system (not illustrated) that controls the vehicle C, there may be no ignition switch, and it is sufficient if there is any signal or state quantity with which the determination unit 12 of the vehicle controller 10 can detect that traveling of the vehicle C has ended. In this case, the determination unit 12 checks the above-described signal and state quantity instead of the ignition switch 7 in step S303 of FIG. 3.

Fifth Modified Example

In the first embodiment described above, in a case where the charging standby mode is OFF (step S304: OFF in FIG. 3), the processing immediately proceeds to the power-off routine. However, regardless of the setting of the charging standby mode, a predetermined standby time may be provided to wait for insertion of the charging gun G, and during the standby time, the connected state of the main relay circuit 2 may be maintained. In other words, it is sufficient if a time for which the connected state of the main relay circuit 2 is maintained in a case where the charging standby mode is ON may be longer than that in a case where the charging standby mode is OFF.

Second Embodiment

A second embodiment of a vehicle controller which is the relay control device according to the present invention will be described with reference to FIGS. 5 to 7. In the following description, the same components as those of the first embodiment are denoted by the same reference signs, and differences will be mainly described. The points not specifically described are the same as those in the first embodiment. The present embodiment is different from the first embodiment mainly in that a distance to a charging spot is used for determination instead of a state of a charging switch 8.

(Configuration of Vehicle)

Figure 5:
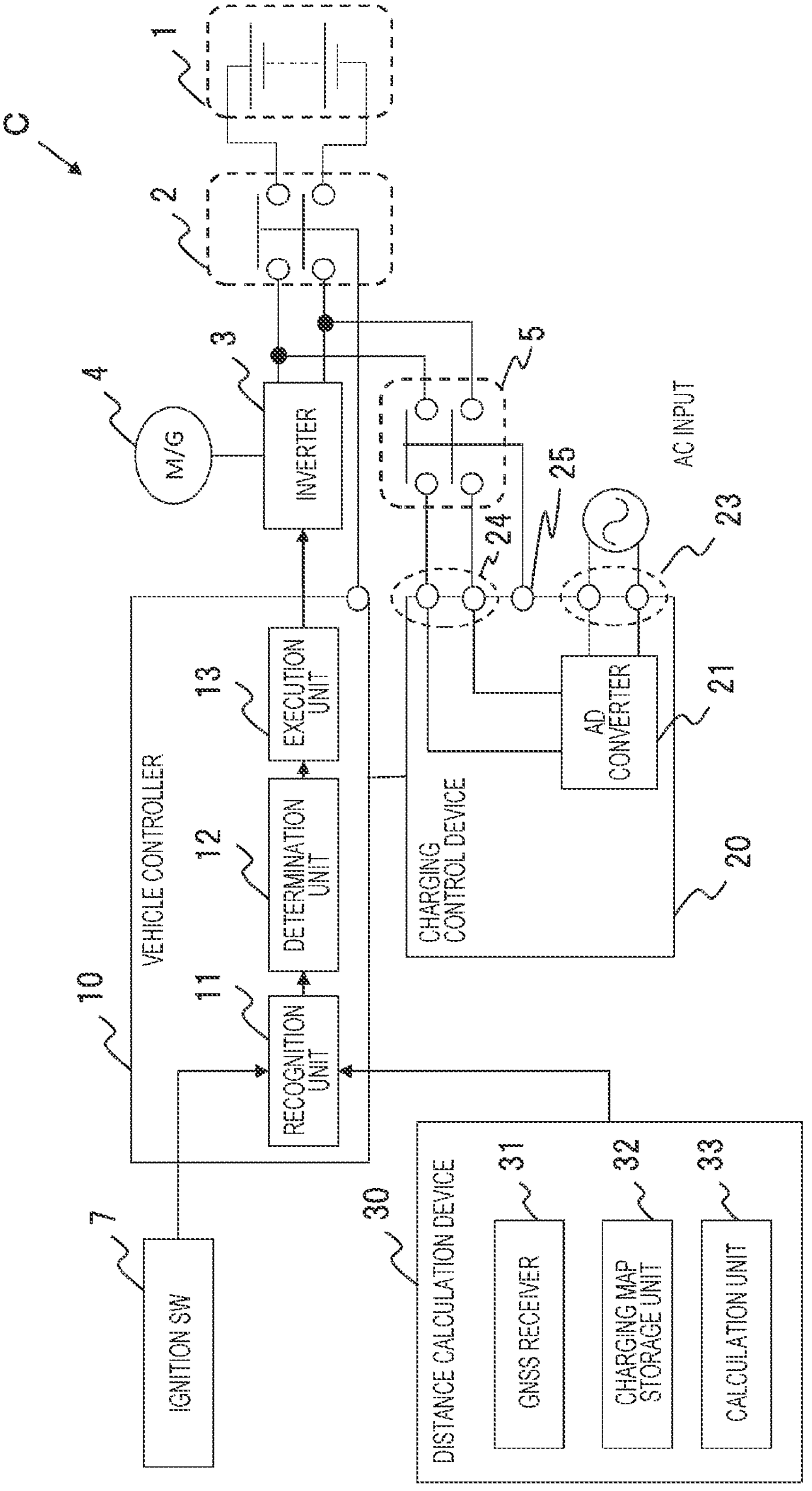
FIG. 5 is a diagram illustrating a configuration of a vehicle according to a second embodiment.

FIG. 5 is a configuration diagram of a vehicle C according to the second embodiment. The vehicle C according to the present embodiment includes a distance calculation device 30. The distance calculation device 30 includes a GNSS receiver 31, a charging map storage unit 32, and a calculation unit 33. The distance calculation device 30 is, for example, an electronic control device, and includes computable hardware. The computable hardware is, for example, at least one of a combination of a CPU, a ROM, and a RAM, an FPGA which is a rewritable logic circuit, or an ASIC.

The GNSS receiver 31 is a receiver corresponding to a global navigation satellite system, and receives radio waves from a plurality of satellites to calculate the latitude and longitude of the vehicle C. Hereinafter, a combination of latitude information and longitude information is also referred to as "position information". Furthermore, since the GNSS receiver 31 calculates the position of the vehicle C, the GNSS receiver 31 can be referred to as a "position calculation unit". The charging map storage unit 32 is a nonvolatile storage device, for example, a flash memory. The charging map storage unit 32 stores position information of a charging spot S, that is, a combination of the latitude and the longitude.

The calculation unit 33 calculates a distance between the vehicle C and the charging spot S (hereinafter, also referred to as an "inter-spot distance"), and outputs the distance to a recognition unit 11 of a vehicle controller 10. Specifically, the calculation unit 33 calculates a linear distance between the position of the vehicle C calculated by the GNSS receiver 31 and the position of the power receiving spot S from a difference between the latitudes and the longitudes. In a case where the position information of the plurality of charging spots S is stored in the charging map storage unit 32, the calculation unit 33 calculates a distance to the charging spot S closest to the vehicle C.

The recognition unit 11 transmits information regarding the inter-spot distance output from the distance calculation device 30 to the determination unit 12. The determination unit 12 determines whether or not the distance between the vehicle C and the charging spot S is within a predetermined chargeable distance. The predetermined chargeable distance is, for example, a known reachable distance of the charging gun G. The determination unit 12 acquires the distance between the vehicle C and the charging spot S from the distance calculation device 30 via the recognition unit 11.

(Flowchart)

Figure 6:
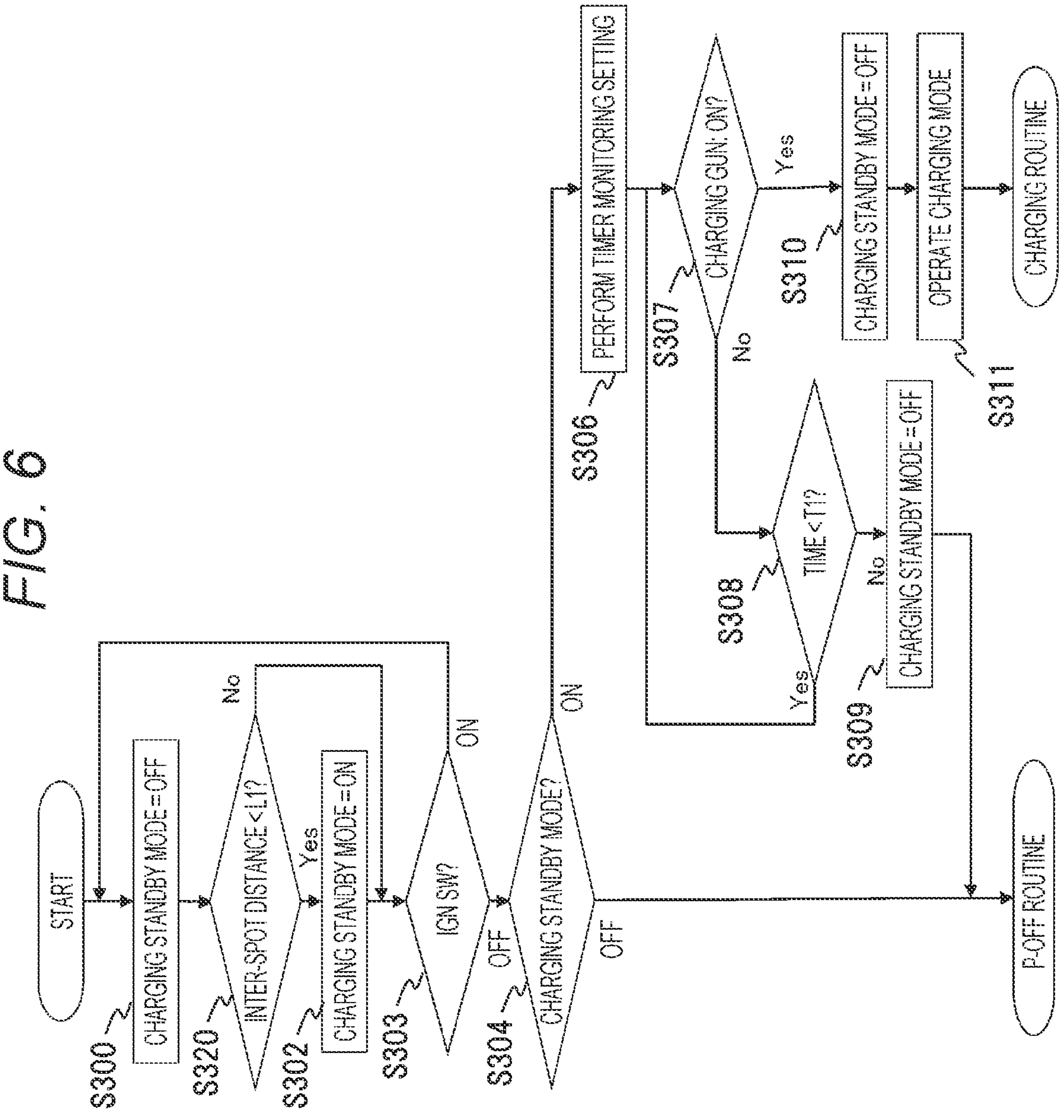
FIG. 6 is a flowchart illustrating an operation of a determination unit according to the second embodiment.

FIG. 6 is a flowchart illustrating processing in the determination unit 12 according to the second embodiment. The flowchart is different in that step S320 is included instead of step S301 of the flowchart according to the first embodiment. Since processing in other steps is the same, a description thereof is omitted. In step S320, the determination unit 12 determines whether or not the distance between the vehicle C and the charging spot S output by the distance calculation device 30 is less than a predetermined threshold L1. In a case where it is determined that the inter-spot distance is less than L1, the determination unit 12 proceeds to step S302, and in a case where it is determined that the inter-spot distance is equal to or more than L1, the determination unit proceeds to step S303. Since the processing after step S302 is similar to that of the first embodiment, a description thereof will be omitted.

(Time Chart)

Figure 7:
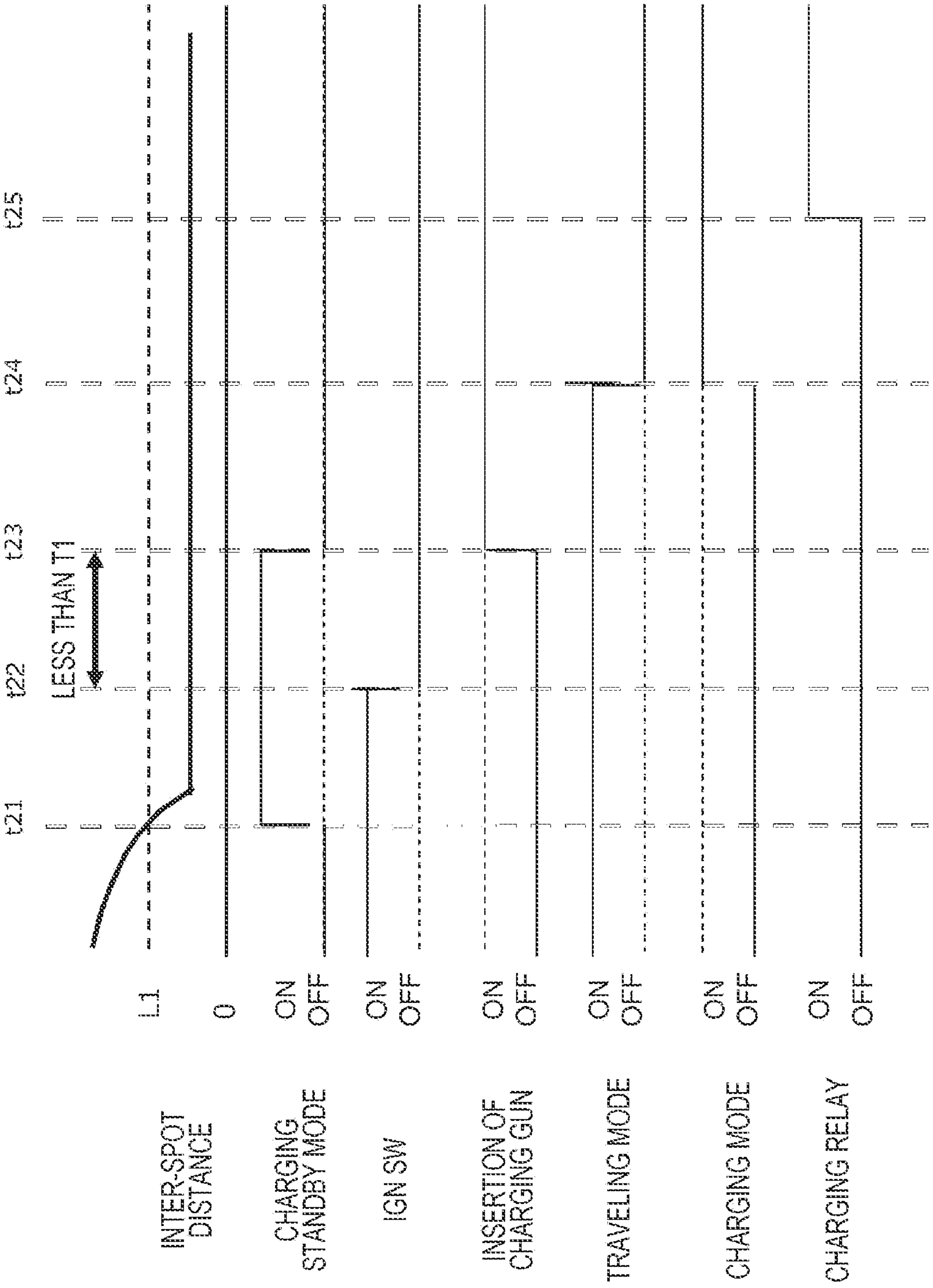
FIG. 7 is a time chart according to the second embodiment.

FIG. 7 is a time chart according to the second embodiment and corresponds to FIG. 4 according to the first embodiment. A configuration of the time chart illustrated in FIG. 7 is similar to that of the first embodiment. In a case where the distance between the vehicle C and the charging spot S becomes less than the threshold L1 at time t21, an affirmative determination is made in step S320, so that the charging standby mode is set to ON in step S302. Since subsequent processing is similar to that of the first embodiment, a description thereof is omitted.

According to the above-described second embodiment, the following actions and effects can be obtained.

(4) The vehicle controller 10 which is the relay control device and the distance calculation device 30 include the distance calculation device 30 that calculates a distance to the charging spot S which is a facility capable of charging a battery 1. When it is detected that the distance between the vehicle C and the charging spot S is less than a predetermined distance, the determination unit 12 maintains the ON state of the main relay circuit 2 for at least time T1 after the recognition unit 11 detects the end of traveling of the vehicle C. Therefore, the vehicle controller 10 determines that the battery 1 is highly likely to be charged when the vehicle stops near the charging spot S and maintains the ON state of the main relay circuit 2 for time T1 without requiring a user operation, thereby preventing wear of a contact of the main relay circuit 2.

(5) The distance calculation device 30 includes the GNSS receiver 31 that calculates the position information of the vehicle C, and the charging map storage unit 32 that stores the position information of the charging spot S. The calculation unit 33 calculates the distance between the vehicle C and the charging spot S by using the position information of the vehicle C calculated by the GNSS receiver 31 and the position information of the charging spot S stored in the charging map storage unit 32.

First Modified Example of Second Embodiment

The distance calculation device 30 calculates the distance between the vehicle C and the charging spot S by using the position information of the vehicle C and the position information of the charging spot S. However, the distance calculation device 30 may calculate the distance between the vehicle C and the charging spot S by a different method. For example, a marker having a predetermined shape may be attached to the charging spot S, the marker may be recognized by multiple cameras (not illustrated) mounted on the vehicle C, and the distance may be calculated using a parallax of the plurality of cameras. In addition, a retroreflective sheet having a predetermined shape may be attached to the charging spot S, the retroreflective sheet may be detected by a pattern of an intensity of reflected laser light using a laser transmitter and a laser receiver (not illustrated) mounted on the vehicle C, and the distance may be calculated from a time required for laser reciprocation.

Second Modified Example of Second Embodiment

Figure 8:
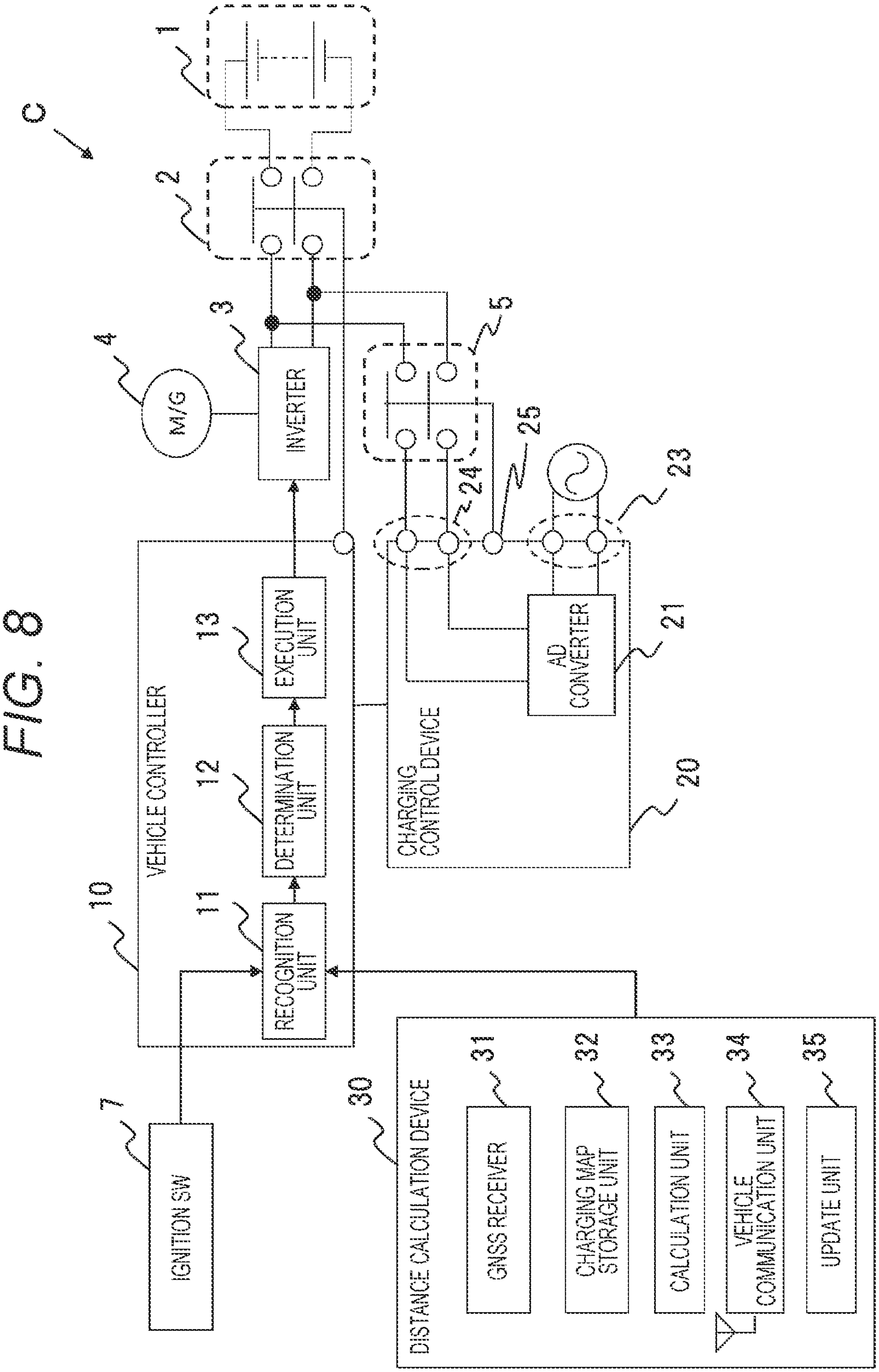
FIG. 8 is a configuration diagram of a vehicle C according to a second modified example of the second embodiment.

FIG. 8 is a configuration diagram of a vehicle C according to a second modified example of the second embodiment. In the present modified example, a distance calculation device 30 of the vehicle C includes a vehicle communication unit 34 and an update unit 35. The vehicle communication unit 34 is a communication device including a wireless communication module incorporated therein. The vehicle communication unit 34 is a telematics communication unit (TCU). The vehicle communication unit 34 may be compatible with a long distance communication standard of 4G or 5G, or may be compatible with a short-range communication standard such as vehicle-to-vehicle communication, IEEE 802.3, or IEEE 802.15.1. The update unit 35 communicates with the outside of the vehicle C by using the vehicle communication unit 34, and updates the position information of the charging spot S stored in a charging map storage unit 32. The update is at least one of addition, deletion, or substitution.

According to the present modified example, the following actions and effects can be obtained.

(6) The distance calculation device 30 includes the vehicle communication unit 34 that can communicate with the outside of the vehicle C, and the update unit 35 that updates the position information of the charging spot S stored in the charging map storage unit 32 based on communication using the vehicle communication unit 34. Therefore, the distance calculation device 30 can calculate an accurate distance between the vehicle C and the charging map S by updating the position information of the charging map S.

Third Modified Example of Second Embodiment

The vehicle controller 10 and the distance calculation device 30 may be integrally configured.

Third Embodiment

A third embodiment of a vehicle controller which is the relay control device according to the present invention will be described with reference to FIGS. 9 to 11. In the following description, the same components as those of the first embodiment are denoted by the same reference signs, and differences will be mainly described. The points not specifically described are the same as those in the first embodiment. The present embodiment is different from the first embodiment mainly in that a main relay circuit is controlled based on communication.

(Configuration)

Figure 9:
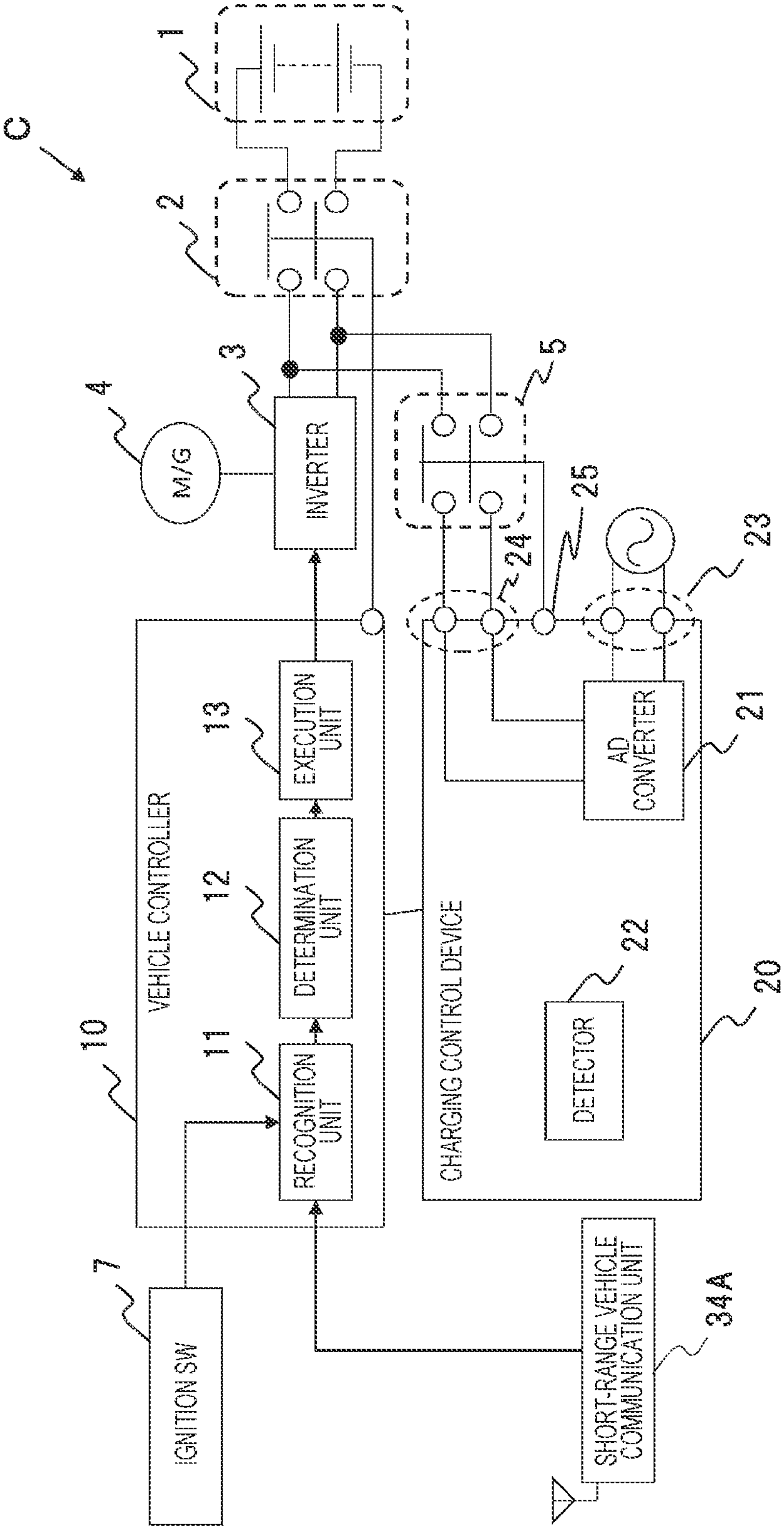
FIG. 9 is a diagram illustrating a configuration of a vehicle according to a third embodiment.

FIG. 9 is a configuration diagram of a vehicle C according to the third embodiment. The vehicle C according to the present embodiment is different from the first embodiment in that a short-range vehicle communication unit 34A is provided instead of the charging SW 8. The short-range vehicle communication unit 34A is a wireless communication module compatible with a short-range communication standard such as IEEE 802.3 or IEEE 802.15.1, and in a case where a distance between a charging spot S and the short-range vehicle communication unit 34A is a communicable distance, the charging spot S and the short-range vehicle communication unit 34A communicate with each other. The short-range vehicle communication unit 34A outputs received information to a recognition unit 11. The recognition unit 11 outputs the information received from the short-range vehicle communication unit 34A to a determination unit 12.

In a case where the distance between the short-range vehicle communication unit 34A and the charging spot S is longer than a reachable distance of radio waves, the short-range vehicle communication unit 34A and the charging spot S cannot communicate with each other. Therefore, In a case where any message is received from the charging spot S, the determination unit 12 of a vehicle controller 10 can determine that a distance to the communication spot S is within a predetermined distance. In the present embodiment, the determination unit 12 sets a charging standby mode to ON when information indicating that charging is available is received, which will be described later, from the charging spot S.

The charging spot S according to the present embodiment includes a short-distance wireless communication device incorporated therein, and transmits information indicating whether or not charging is available. The charging spot S outputs information indicating that charging is not available in a case where a vehicle cannot be charged because another vehicle is already being charged or in a case where a failure occurs, and outputs information indicating that charging is available in a case where charging is available.

(Flowchart)

Figure 10:
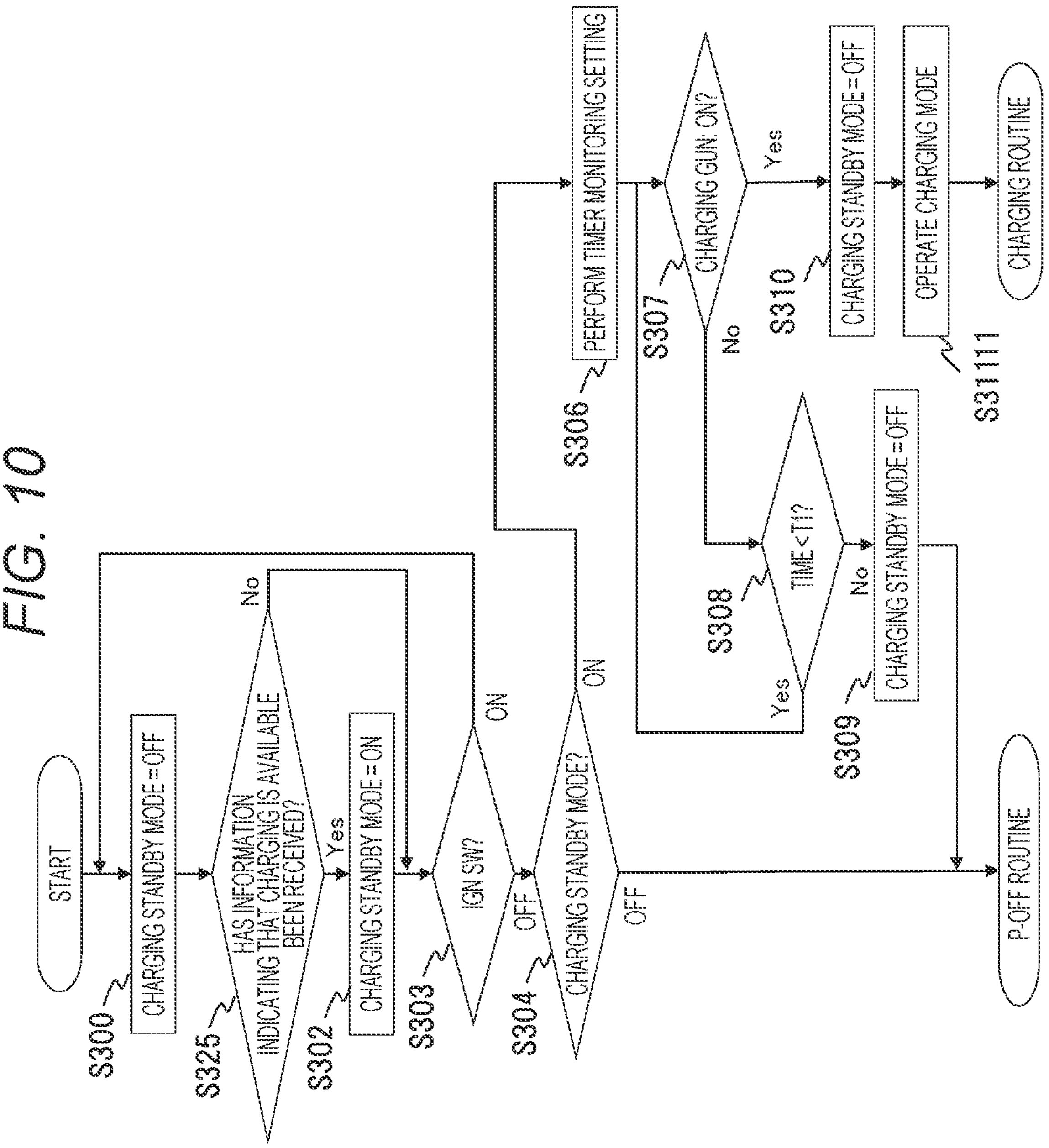
FIG. 10 is a flowchart illustrating an operation of a determination unit according to the third embodiment.

FIG. 10 is a flowchart illustrating processing in the determination unit 12 according to the third embodiment. The flowchart is different in that step S325 is included instead of step S301 of the flowchart according to the first embodiment. Since processing in other steps is the same, a description thereof is omitted. In step S325, the determination unit 12 determines whether or not the information indicating that charging is available has been received from the charging spot S. In a case where it is determined that the information indicating that charging is available has been received, the determination unit 12 proceeds to step S302. In a case where the determination unit 12 determines that the information indicating that charging is available has not been received, that is, in a case where the distance to the charging spot S is long and communication with the charging spot S cannot be performed or in a case where charging is not available due to a failure or a use, the determination unit 12 proceeds to step S303. Since the processing after step S302 is similar to that of the first embodiment, a description thereof will be omitted.

(Time Chart)

Figure 11:
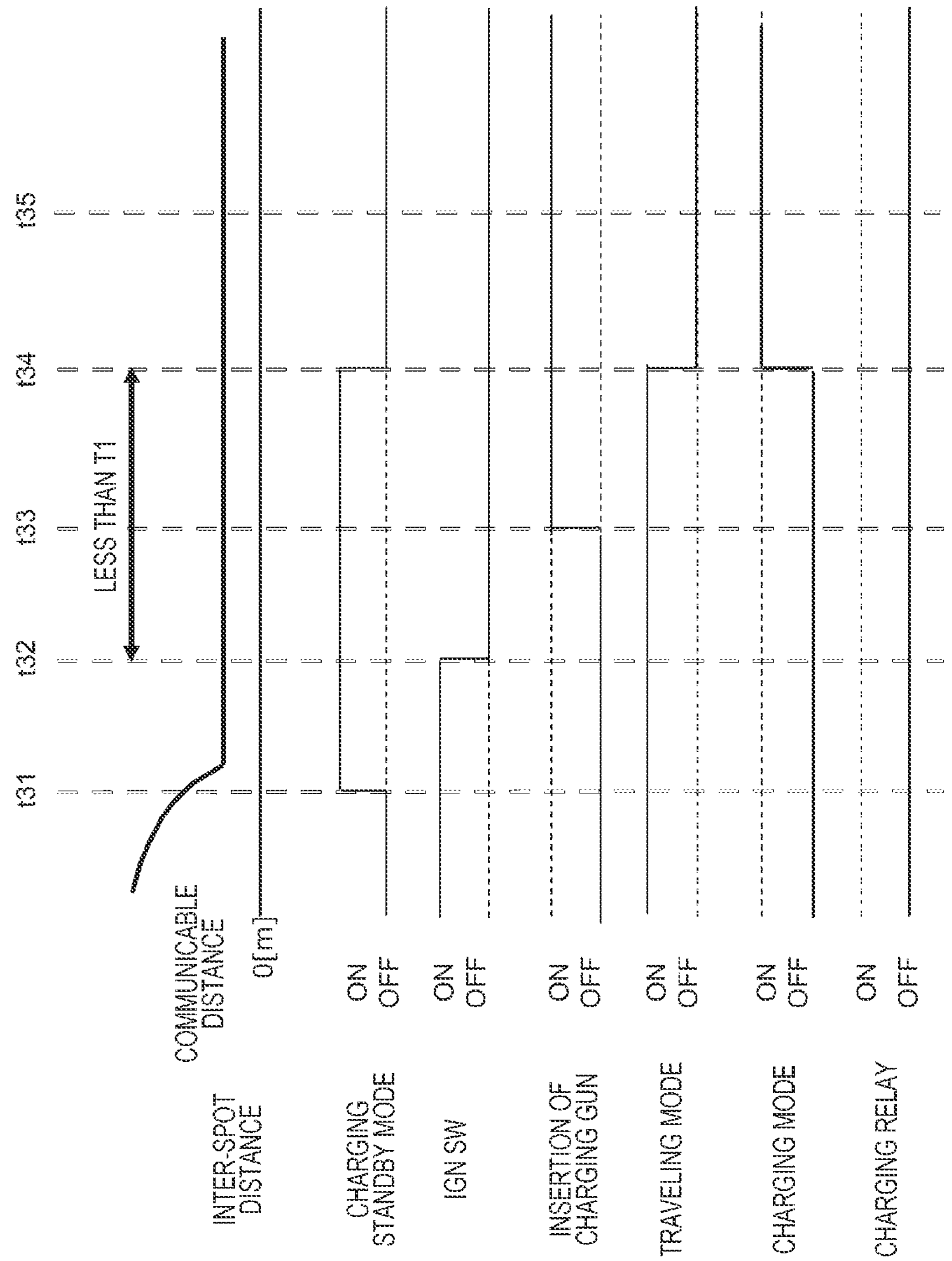
FIG. 11 is a time chart according to the third embodiment.

FIG. 11 is a time chart according to the third embodiment and corresponds to FIG. 4 according to the first embodiment. A configuration of the time chart illustrated in FIG. 11 is similar to that of the first embodiment. In a case where the distance between the vehicle C and the charging spot S becomes less than the threshold L1 at time t21, an affirmative determination is made in step S320, so that the charging standby mode is set to ON in step S302. Since subsequent processing is similar to that of the first embodiment, a description thereof is omitted.

According to the above-described third embodiment, the following actions and effects can be obtained.

(7) The vehicle C includes the short-range vehicle communication unit 34A that can communicate with a spot communication device included in the charging spot S, which is equipment that can charge a battery 1. The determination unit 12 determines a possibility that power is supplied from the outside to the battery based on communication between the short-range vehicle communication unit 34A and the spot communication device. Therefore, the vehicle controller 10 can determine a possibility of performing charging by communicating with the charging spot S even in a case where the position information of a charging map S is not held.

First Modified Example of Third Embodiment

The charging spot S may output a signal indicating the presence of the charging spot S instead of outputting the information indicating whether or not charging is available. In this case, the determination unit 12 determines whether or not a signal from the charging spot S has been received in step S325.

Second Modified Example of Third Embodiment

The charging spot S and the vehicle communication unit 34 may compatible with a communication standard of 4G or 5G and perform communication via a base station. In this case, a distance between the charging spot S and the vehicle communication unit 34 can be evaluated based on the sameness of the base stations used by the charging spot S and the vehicle communication unit 34 or a distance between the base stations used by the charging spot S and the vehicle communication unit 34. In addition, the charging spot S may transmit its own latitude and longitude, and the determination unit 12 of the vehicle C that has received the latitude and longitude may calculate the position of the vehicle C by using a GNSS receiver (not illustrated) provided in the vehicle C and evaluate the distance between the charging spot S and the vehicle communication unit 34.

Fourth Embodiment

A fourth embodiment of a vehicle controller which is the relay control device according to the present invention will be described with reference to FIGS. 12 to 14. In the following description, the same components as those of the first embodiment are denoted by the same reference signs, and differences will be mainly described. The points not specifically described are the same as those in the first embodiment. The present embodiment is different from the first embodiment mainly in that connection of a main relay circuit is extended by opening and closing of the door and non-detection of radio waves from a smart key.

(Configuration of Vehicle)

Figure 12:
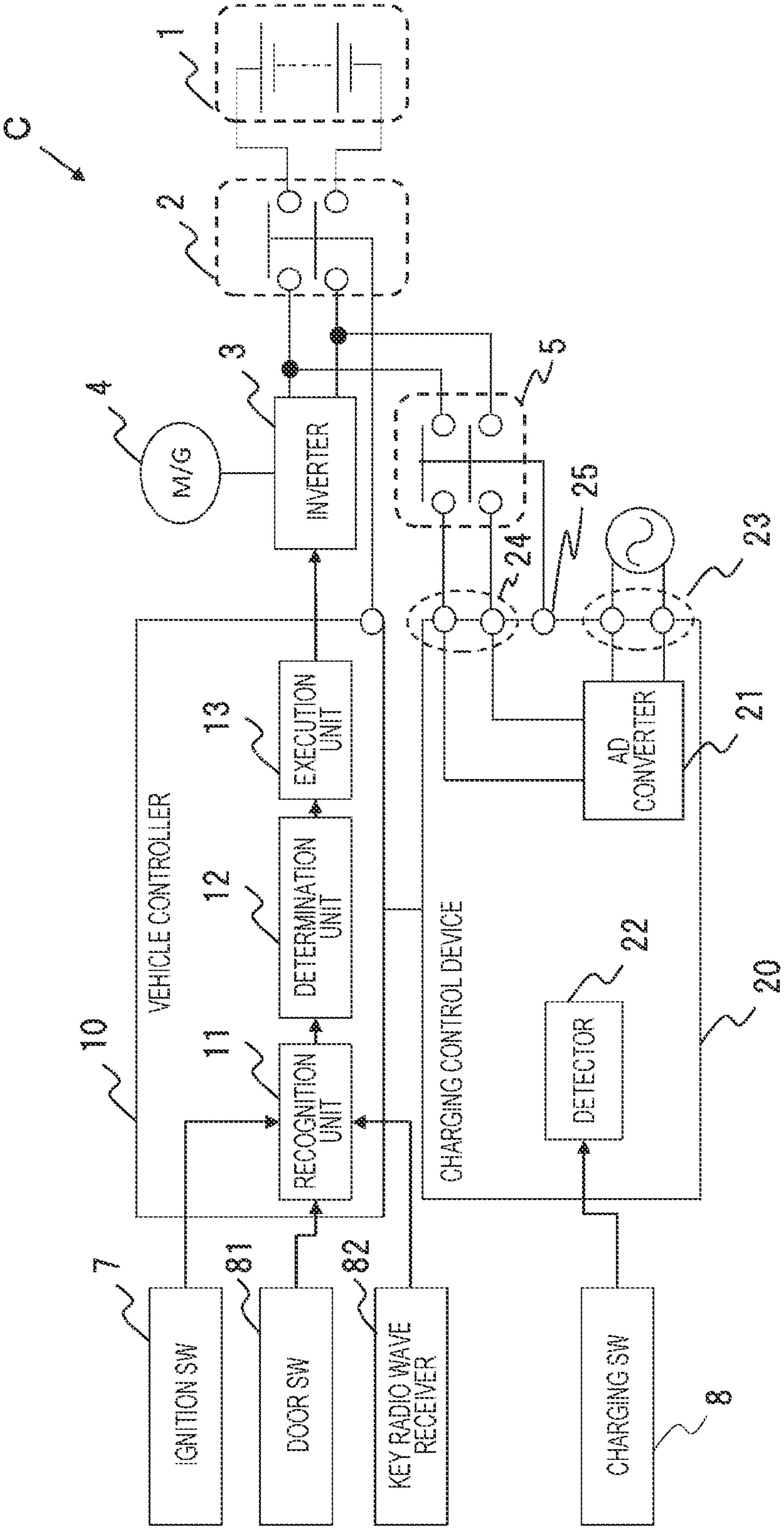
FIG. 12 is a diagram illustrating a configuration of a vehicle according to a fourth embodiment.

FIG. 12 is a configuration diagram of a vehicle C according to the fourth embodiment. In the vehicle C according to the present embodiment, in addition to the configuration of the first embodiment, a door switch 81 and a door switch 81 including a key radio wave receiver 82 detect opening and closing of a door of the vehicle C and outputs the detection result to a recognition unit 11. In the present embodiment, a smart key is required to start the vehicle C. The key radio wave receiver 82 includes a circuit capable of receiving a radio wave emitted from the smart key, and outputs a notification indicating that the signal is lost to the recognition unit 11 when the radio wave from the smart key cannot be received.

Hereinafter, transitioning from a reception state in which the radio wave is received from the smart key to a non-reception state in which the radio wave is not received from the smart key is referred to as “non-detection of the radio wave of the smart key” or “smart key signal loss”. When the user repeatedly moves away from and approaches to the vehicle C, the transitioning from the reception state to the non-reception state for the smart key signal is repeated many times. Therefore, the key radio wave receiver 82 repeatedly outputs a notification indicating that the signal is lost to the recognition unit 11. However, in a case where transitioning from the reception state to the non-reception state is made and the non-reception state is maintained, the key radio wave receiver 82 outputs the notification of the loss only once for the first time. The recognition unit 11 outputs information obtained from the door switch 81 and the key radio wave receiver 82 to a determination unit 12.

In the present embodiment, the determination unit 12 performs the following operation in addition to the operation of the first embodiment. That is, every time the door of the vehicle C is opened and closed and every time the signal of the smart key is lost, the determination unit 12 extends a time for waiting for insertion of a charging gun G while maintaining connection of a main relay circuit 2. In the following flowchart, both a case where the door is opened and closed and a case where the signal of the smart key is lost, the time is uniformly extended by time T2, but the extended time may vary depending on the operation. In the present embodiment, “opening/closing” of the door is defined as one set of opening of the door and closing of the door. That is, in the present embodiment, only opening of the door or only closing of the door is not regarded as opening and closing of the door.

(Flowchart)

Figure 13:
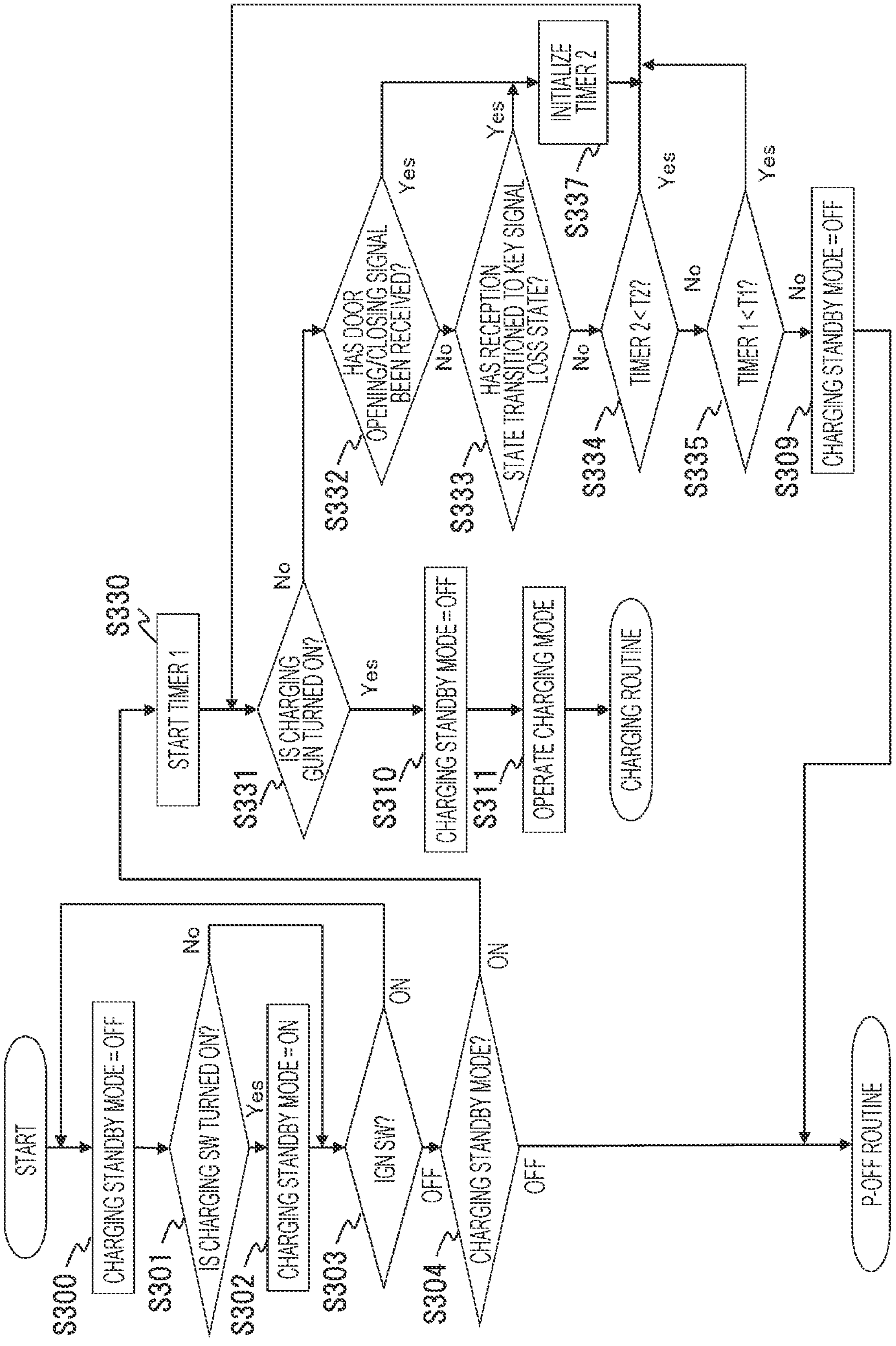
FIG. 13 is a flowchart illustrating an operation of a determination unit according to the fourth embodiment.

FIG. 13 is a flowchart illustrating processing in the determination unit 12 according to the fourth embodiment. The flowchart is the same as the flowchart according to the first embodiment up to step S304, and processing after step S305 is different. In step S330 executed in a case where it is determined in step S304 that a charging standby mode is ON, the determination unit 12 starts timer 1. The processing in this step is substantially the same as that in step S306 of the first embodiment, but since there are two timers in this flowchart, steps S306 and S330 are different in that a timer to be operated is specified.

In subsequent step S331, the determination unit 12 determines whether or not the charging gun G has been inserted by using an output of the recognition unit 11. In a case where it is determined that the charging gun G has been inserted, the processing proceeds to step S310. In a case where it is determined that the charging gun G has not been inserted, the processing proceeds to step S332. Since the processing after step S310 is similar to that of the first embodiment, a description thereof will be omitted. In step S332, the determination unit 12 determines whether or not a signal indicating opening and closing has been received from the door switch 81. Precisely, in step S332, a negative determination is always made when step S332 is executed for the first time, and in the second and subsequent times, it is determined whether or not a signal indicating opening and closing has been received from the door switch 81 after the previous execution of step S332. The determination unit 12 proceeds to step S337 in a case where an affirmative determination is made in step S332, and proceeds to step S333 in a case where a negative determination is made.

In step S333, the determination unit 12 determines whether or not the reception state for the smart key signal has transitioned to the key signal loss state, in other words, whether or not the reception state has transitioned to the non-reception state. Precisely, in step S333, a negative determination is always made when step S333 is executed for the first time, and in the second and subsequent times, it is determined whether or not a signal indicating that the signal is lost has been received from the key radio wave receiver 82 after the previous execution of step S333. The determination unit 12 proceeds to step S337 in a case where an affirmative determination is made in step S333, and proceeds to step S334 in a case where a negative determination is made.

In step S334, the determination unit 12 determines whether or not an elapsed time of timer 2 is less than T2. However, in step S334, in a case where timer 2 has not been started, specifically, in a case where step S337 has not been executed even once, a negative determination is made. Step S337 may be executed a plurality of times, and the elapsed time of timer 2 evaluated in this step is an elapsed time from the last execution of step S337. The determination unit 12 returns to step S331 in a case where it is determined that timer 2 has been started and that the elapsed time of timer 2 is less than T2, and the determination unit 12 proceeds to step S335 in a case where it is determined that timer 2 has not been started or that the elapsed time of timer 2 is equal to or more than T2.

In step S335, the determination unit 12 determines whether or not an elapsed time of timer 1 is less than T1. The elapsed time of timer 1 evaluated in this step is an elapsed time from execution of step S330. The determination unit 12 returns to step S331 in a case where it is determined that the elapsed time of timer 1 is less than T1, and the determination unit 12 proceeds to step S309 in a case where it is determined that the elapsed time of timer 1 is equal to or more than T1. Since the processing after step S309 is similar to that of the first embodiment, a description thereof will be omitted.

In step S337, the determination unit 12 initializes timer 2 and returns to step S331. Specifically, in a case where step S337 is executed for the first time, the count of timer 2 is set to 0 and the operation of timer 2 is started. In a case where step S337 is executed for the second and subsequent times, the time count of timer 2 is reset to 0. Therefore, every time step S337 is executed, the count of timer 2 returns to 0.

(Time Chart)

Figure 14:
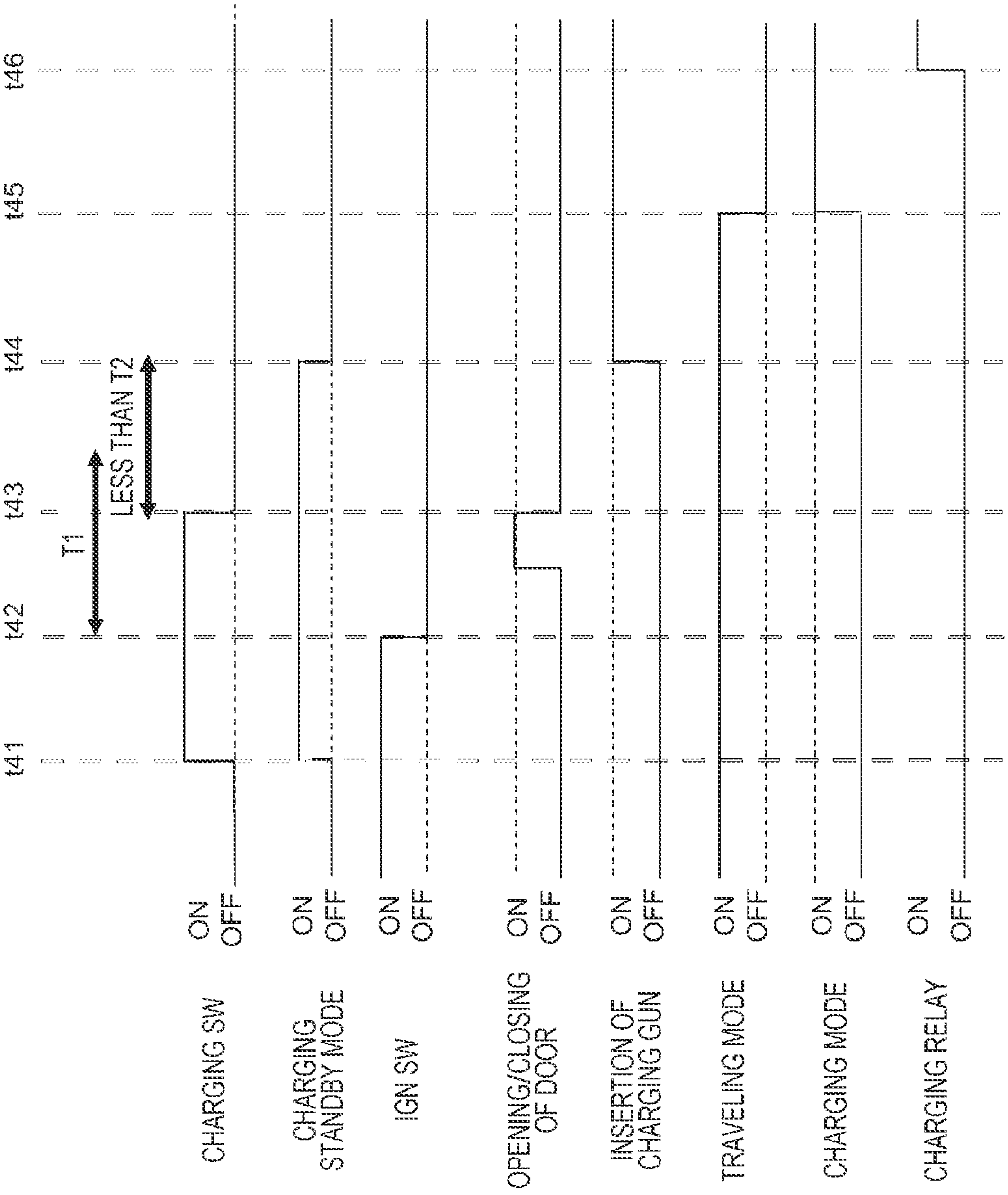
FIG. 14 is a time chart according to the fourth embodiment.
Figure 15:
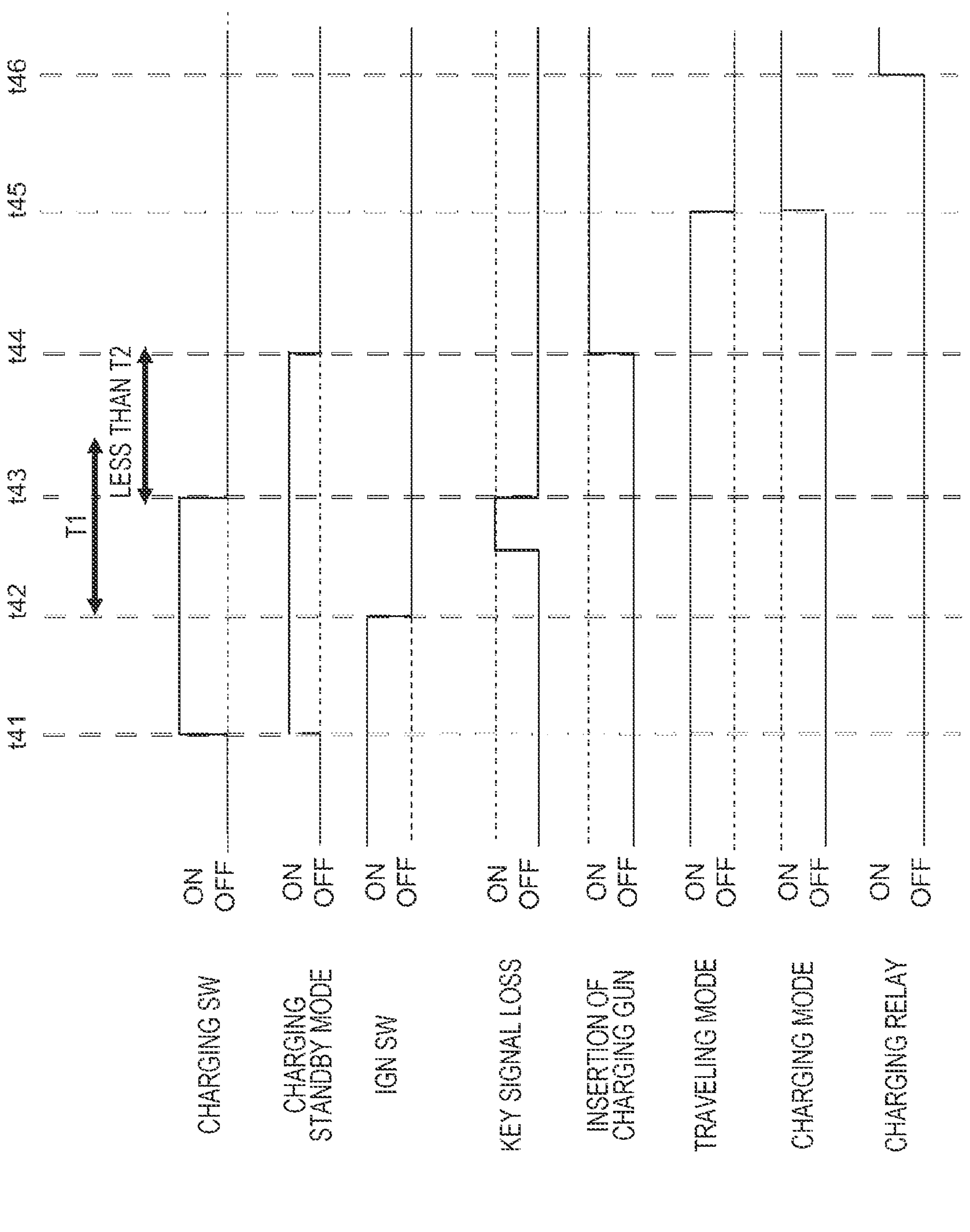
FIG. 15 is a time chart according to the fourth embodiment.

FIGS. 14 and 15 are time charts according to the fourth embodiment, and correspond to FIG. 4 according to the first embodiment. FIG. 14 illustrates an example of a case where the door is opened and closed, and FIG. 15 illustrates an example of a case where the smart key radio wave is not detected. Configurations of the time charts illustrated in FIGS. 14 and 15 are similar to those of the first embodiment. Comparing FIG. 14 with FIG. 15, “opening/closing of door” which is the fourth item from the top in FIG. 14 is replaced with “key signal loss” in FIG. 15. Hereinafter, FIG. 14 will be first described, and then FIG. 15 will be described.

At time t41, a charging switch 8 is turned on by the user, and the charging standby mode is set to ON by the processing of step S302. Next, when an ignition switch 7 is turned off by the user at time t42, an affirmative determination is made in step S304, and timer 1 is started in step S330. Since the charging gun is not inserted at time t42, a negative determination is made in step S331, and a negative determination is made in steps S332 and S333 since the door is not opened and closed and there is no signal loss. In step S334, a negative determination is made because timer 2 has not instructed. In step S335, the count of timer 1 is less than T1, and the processing thus returns to step S331.

Thereafter, when the door is opened and closed by the user at time t43, an affirmative determination is made in step S332, and timer 2 is started in step S337. When the charging gun G is inserted at time t44, an affirmative determination is made in step S331, and the charging routine starts. At time t44, a time equal to or more than time T1 has elapsed from time t42 as a starting point, but the elapsed time from time t43 is less than T2, and thus, the affirmative determination in step S334 is maintained until time t44.

In FIG. 15, the user has moved away from the vehicle C between time t42 and time t43, and the reception state for the smart key signal has transitioned to the lost key signal state. Therefore, the key radio wave receiver 82 outputs a notification indicating that the signal is lost to the recognition unit 11, and an affirmative determination is made in step S333 to start timer 2. When the charging gun G is inserted at time t44, an affirmative determination is made in step S331, and the charging routine starts.

According to the above-described fourth embodiment, the following actions and effects can be obtained.

(8) The vehicle C includes the door switch 81 that detects opening and closing of the door of the vehicle C. When the door switch 81 detects opening and closing of the door of the vehicle C, the determination unit 12 extends a time for maintaining the ON state of the main relay circuit 2.

(9) A smart key that emits a radio wave is required to start the vehicle C. The vehicle controller 10 is connected to the key radio wave receiver 82 that receives the radio wave emitted from the smart key. When the key radio wave receiver 82 cannot receive the radio wave of the smart key, in other words, transitioning of the reception state to the non-reception state occurs, the determination unit 12 assumes that the user holding the smart key has left the vehicle C for charging, and extends a time for maintaining the ON state of the main relay circuit 2.

First Modified Example of Fourth Embodiment

The vehicle C may include at least one of the door switch 81 or the key radio wave receiver 82.

Second Modified Example of Fourth Embodiment

In the above-described fourth embodiment, opening of the door and closing of the door are determined as the opening and closing of the door as one set. However, only opening of the door or only closing of the door may be defined as opening and closing of the door. According to the present modified example, a time for maintaining the ON state of the main relay circuit 2 is extended even in a case where the user leaves the vehicle C and heads for the charging spot S while keeping the door open.

Third Modified Example of Fourth Embodiment

In the above-described fourth embodiment, attention is paid to the point that the reception state for the smart key signal transitions to the non-reception state. However, whether or not the smart key signal has been received may be determined by focusing on the reception state for the smart key signal itself. That is, in step S333 of FIG. 13, it is determined whether or not the smart key signal has been received, and in a case where the smart key signal has been received, the processing proceeds to step S337 to initialize timer 2.

In this case, when the user continues to stay inside the vehicle C, a loop of S331: NO, S332: NO, S333: YES, S337, S331, . . . is repeated. This loop may be repeated indefinitely, or an upper limit may be set for the number of repetitions of the loop, and the flowchart may be changed in such a way that the charging standby mode is set to OFF when a predetermined time, for example, one hour has elapsed even when the user continues to stay inside the vehicle C.

According to the present modified example, the following actions and effects can be obtained.

(10) A smart key that emits a radio wave is required to start the vehicle C. The vehicle controller 10 is connected to the key radio wave receiver 82 that receives the radio wave emitted from the smart key. When the key radio wave receiver 82 receives the radio wave of the smart key, the determination unit 12 extends the time for maintaining the ON state of the main relay circuit 2 because the user holding the smart key stays inside the vehicle C.

In the above-described embodiments and modified examples, the configurations of the functional blocks are merely an example. Some functional configurations illustrated as separate functional blocks may be integrally configured, or a configuration illustrated in one functional block diagram may be divided into two or more functions. In addition, some of the functions of each functional block may be included in another functional block.

The above-described embodiments and modified examples may be combined. Although various embodiments and modified examples have been described above, the present invention is not limited to the contents thereof. Other aspects conceivable within the scope of the technical idea of the present invention also fall within the scope of the present invention.

REFERENCE SIGNS LIST 1 battery
2 main relay circuit
3 inverter
7 ignition switch
8 charging switch
10 vehicle controller
11 recognition unit
12 determination unit
13 execution unit
15 distance calculation device
31 GNSS receiver
32 charging map storage unit
33 calculation unit
34A short-range vehicle communication unit
34 vehicle communication unit
35 update unit
81 door switch
82 key radio wave receiver

The invention claimed is:

1. A relay control device that controls a relay circuit mounted on a vehicle and connecting an inverter circuit that drives a motor mounted on the vehicle and a battery, the relay control device comprising:

an end detection unit that detects that traveling of the vehicle has ended;

a recognition unit that recognizes an intention of a user, who is an occupant of the vehicle, to charge the battery via hardware; and a determination unit that determines a possibility that power is supplied to the battery from an outside, and controls a time taken from when traveling of the vehicle ends to when the relay circuit is turned off based on the determination, wherein when the recognition unit recognizes the intention of the user to charge the battery, the determination unit maintains an ON state of the relay circuit for at least a first predetermined period after the end detection unit detects an end of traveling.

2. The relay control device according to claim 1, wherein the recognition unit recognizes the intention of the user to charge the battery based on detection of pressing of a predetermined button by the user and a processing result of a speech recognition device that recognizes an utterance of the user.

3. The relay control device according to claim 1, further comprising a distance calculation unit that calculates a distance to a charging spot that is a facility configured to charge the battery, wherein when it is detected that the distance between the vehicle and the charging spot is less than a predetermined distance, the determination unit maintains an ON state of the relay circuit for at least a first predetermined period after the end detection unit detects an end of traveling.

4. The relay control device according to claim 3, wherein the distance calculation unit includes a position calculation unit that calculates position information of the vehicle and a charging map storage unit that stores position information of the charging spot, and the distance calculation unit calculates the distance between the vehicle and the charging spot by using the position information of the vehicle calculated by the position calculation unit and the position information of the charging spot stored in the charging map storage unit.

5. The relay control device according to claim 4, further comprising:

a communication unit that is configured to communicate with an outside of the vehicle; and an update unit that updates the position information of the charging spot stored in the charging map storage unit based on communication using the communication unit.

6. The relay control device according to claim 1, wherein the vehicle includes an in-vehicle communication unit configured to communicate with a spot communication device included in a charging spot that is a facility configured to charge the battery, and the determination unit determines a possibility that power is supplied to the battery from an outside based on communication between the in-vehicle communication unit and the spot communication device.

7. The relay control device according to claim 1, wherein a key that emits a radio wave is required to start the vehicle, the relay control device is connected to a receiver that receives the radio wave, and the determination unit extends a time for maintaining an ON state of the relay circuit when the radio wave is received by the receiver.

8. A relay control device that controls a relay circuit mounted on a vehicle and connecting an inverter circuit that drives a motor mounted on the vehicle and a battery, the relay control device comprising:

an end detection unit that detects that traveling of the vehicle has ended; and a determination unit that determines a possibility that power is supplied to the battery from an outside, and controls a time taken from when traveling of the vehicle ends to when the relay circuit is turned off based on the determination, wherein the vehicle includes a door switch that detects opening and closing of a door of the vehicle, and the determination unit extends a time for maintaining an ON state of the relay circuit when the door switch detects opening and closing of the door of the vehicle.

9. A relay control device that controls a relay circuit mounted on a vehicle and connecting an inverter circuit that drives a motor mounted on the vehicle and a battery, the relay control device comprising:

an end detection unit that detects that traveling of the vehicle has ended; and a determination unit that determines a possibility that power is supplied to the battery from an outside, and controls a time taken from when traveling of the vehicle ends to when the relay circuit is turned off based on the determination, wherein a key that emits a radio wave is required to start the vehicle, the relay control device is connected to a receiver that receives the radio wave, and the determination unit extends a time for maintaining an ON state of the relay circuit when the radio wave is unreceivable by the receiver.

* * * * *